United States Patent

[11] 3,591,827

| [72] | Inventor | Lewis D. Hall<br>Palo Alto, Calif. |
|---|---|---|
| [21] | Appl. No. | 686,609 |
| [22] | Filed | Nov. 29, 1967 |
| [45] | Patented | July 6, 1971 |
| [73] | Assignee | Andar/ITI, Inc.<br>Sunnyvale, Calif. |

[54] ION-PUMPED MASS SPECTROMETER LEAK DETECTOR APPARATUS AND METHOD AND ION PUMP THEREFOR
10 Claims, 5 Drawing Figs.

| [52] | U.S. Cl. | 315/108, 313/7, 324/33 |
|---|---|---|
| [51] | Int. Cl. | H01j 17/22 |
| [50] | Field of Search | 324/33; 315/108 |

[56] References Cited
UNITED STATES PATENTS

| 2,486,199 | 10/1949 | Nier | 324/33 X |
|---|---|---|---|
| 3,280,619 | 10/1966 | Spies | 324/33 X |
| 3,391,303 | 7/1968 | Hall | 315/108 |

*Primary Examiner*—RAymond F. Hossfeld
*Attorney*—Harvey G. Lowhurst

ABSTRACT: A mass spectrometer is connected to a vacuum system which includes a vacuum-pumping system and which is communicated with the vessel under test exposed to a suitable probe gas. The vacuum-pumping system consists of a first stage in the form of a mechanical roughing pump for reducing the system pressure to roughing pressure, and a second stage in the form of a high-vacuum pump which comprises an electronic getter-ion (sublimation) pump for pumping the chemically active nonnoble gases in combination with a Penning discharge chamber which houses discharge cathodes exposed to the deposit of the getter material from the getter-ion pump for pumping the noble gas.

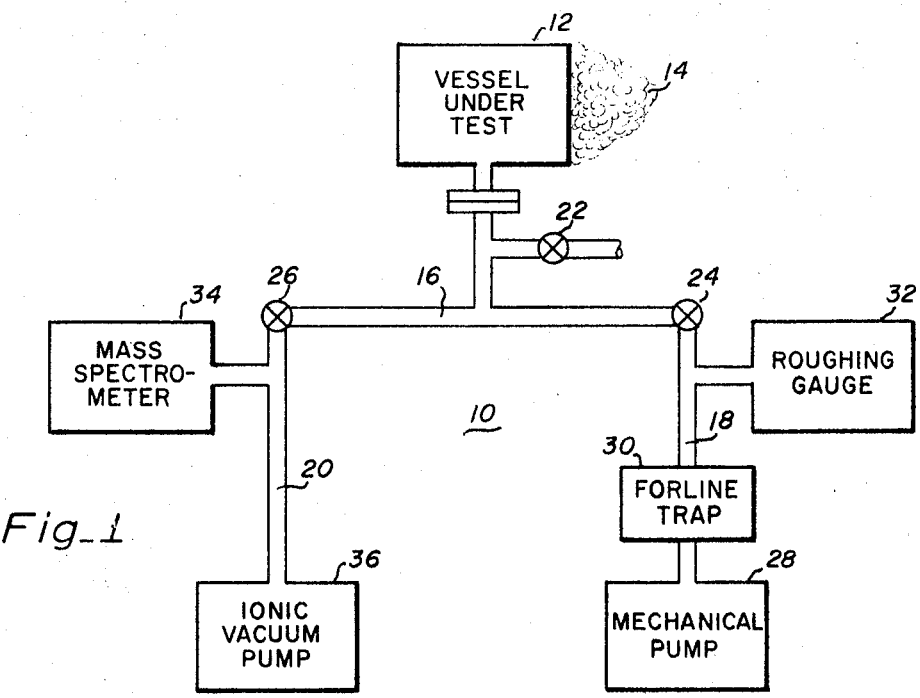
Fig_1
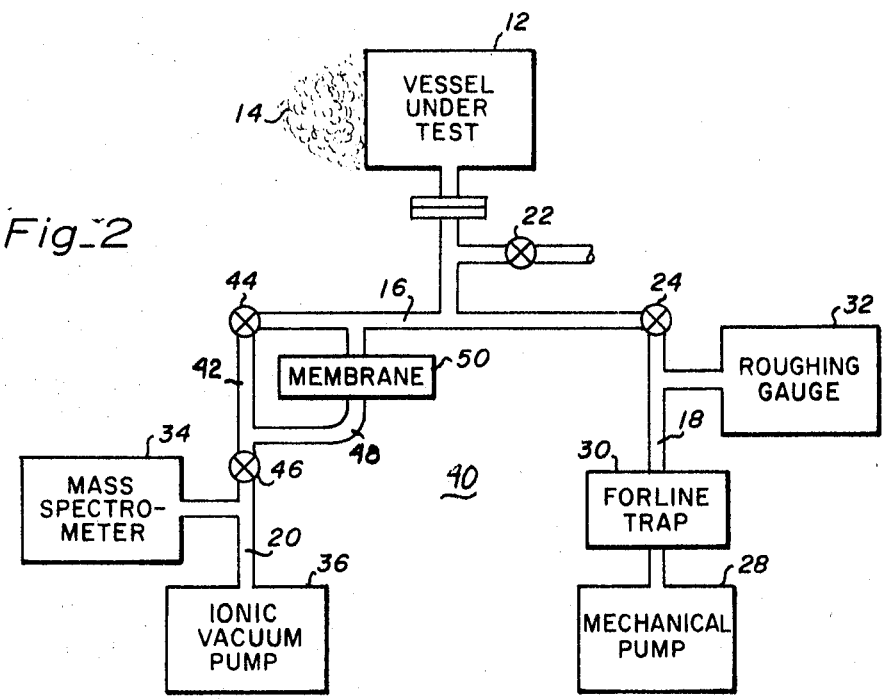
Fig_2
INVENTOR
LEWIS D. HALL
BY Harvey S. Cowhurst
ATTORNEY

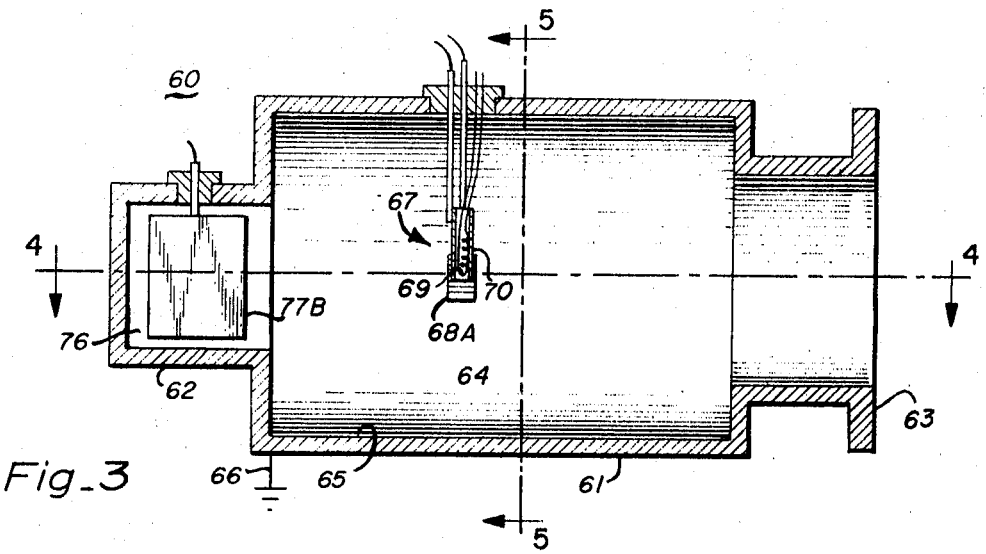
Fig_3
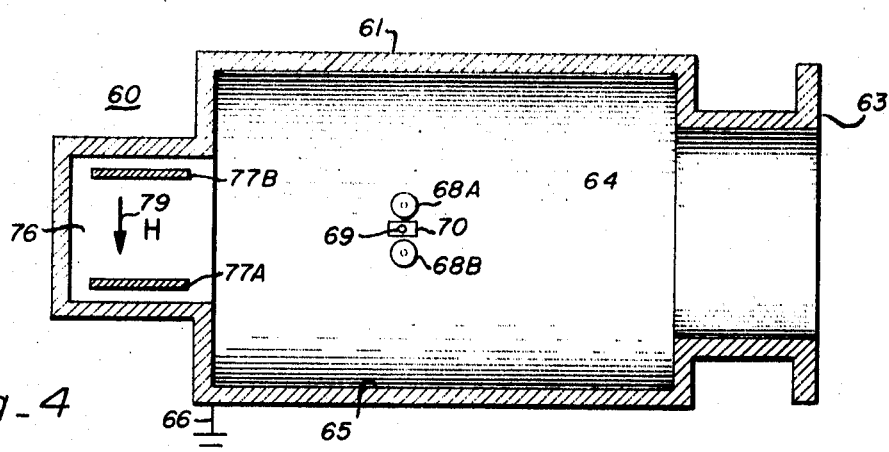
Fig_4
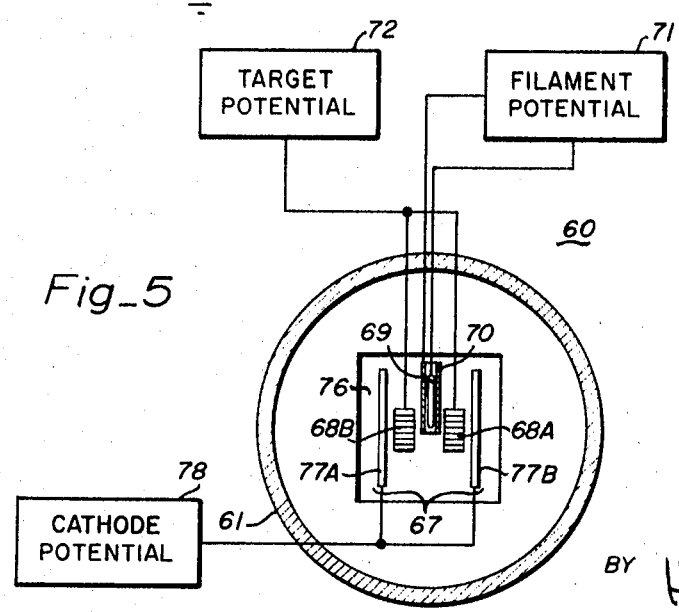
Fig_5
INVENTOR
LEWIS D. HALL

ION-PUMPED MASS SPECTROMETER LEAK DETECTOR APPARATUS AND METHOD AND ION PUMP THEREFOR

BACKGROUND OF THE INVENTION

1. Field of the Invention

This invention relates to leak detectors employing a mass spectrometer connected to a high-vacuum system to detect the presence of a probe gas to which a vessel under test is exposed and, more particularly, to a leak detector of this general type which utilizes a special type of a high-vacuum pump which employs the getter-ion technique, in combination with certain aspects of the sputter-ion technique, to reduce the pressure in the high-vacuum system from roughing pressure to mass spectrometer pressure. This invention also relates to this special type of high-vacuum pump which is suitable for pumping all gases including noble gases.

2. Description of the Prior Art

Heretofore, mass spectrometer leak detectors have almost exclusively utilized an oil or similar type of diffusion pump to reduce the pressure of the high-vacuum system from roughing pressure (typically $10^{13}$ torr) to spectrometer pressure (typically $10^{16}$ torr or below), and the literature is replete with statements that a diffusion pump is absolutely essential for pumping the high-vacuum system of the mass spectrometer leak detector because of the property of such a pump to prevent the reevolution of helium or other noble gases usually used as probe gases. The only exception to exclusively relying on a diffusion pump as the only high-vacuum pump of such a system is to supplement the diffusion pump with a getter-ion pump to aid in the pumping of the chemically active gases while purposely not pumping the probe gases, and to increase the concentration of helium and other noble gases ordinarily used as probe gases in order to increase the sensitivity of the leak detector.

One reason advanced for the substantially exclusive employment of diffusion pumps for leak detectors is the fact that such pumps have a short memory for noble gases, and therefore are able to reduce the noble gas background of the system to acceptable levels. Conventional sputter-ion pumps, on the other hand, have been found to have extremely long memories for helium and other noble probe gases. As a result of such long memory, any helium or other noble probe gas entering the high-vacuum system through a leak in the vessel under test increases the noble gas background level to a value in excess of an acceptable level. The background remains excessively high long after the source of the probe gas is removed, thereby rendering the leak detector useless for further work for a period of time which may often be in excess of 24 hours.

The primary disadvantage of the prior art mass spectrometer leak detectors is the presence of oil vapor which is a contaminant, and which results in the requirement for a liquid nitrogen trap between the diffusion pump and the mass spectrometer to keep the oil out of the spectrometer tube, and to decrease the pressure to desirably high vacuum values. Oil molecules are a recognized problem source in leak detectors since they are responsible for the erratic behavior of the spectrometer tube and the vacuum gauges. Because of the oil in the system and the problems associated with the presence of such oil, a conservative estimate is that the presence of oil causes a 50 percent down time of the leak detector during which it is not available for testing.

The requirement for pumping noble gas is not restricted to leak detectors, and most applications have resulted in the employment of diffusion pumps which do pump noble gas and have a low noble gas memory. However, the disadvantages of such pumps, enumerated in connection with leak detector systems, are also true of other applications.

One attempt to provide a "clean" vacuum pump capable of pumping noble gas, that is, a pump which does not contaminate a system with oil molecules, has resulted in the construction of a cold cathode sputter-ion pump in which the effective surfaces of the sputter cathodes have continually deposited thereon a getter material such as titanium to prevent or at least minimize the sputtering of the noble gas ions which were previously buried in the cathode. Such a pump is disclosed in my copending U.S. Pat. application, Ser. No. 427,833, filed Jan. 25, 1965 now U.S. Pat. No. 3,391,303, and basically comprises a sputter-ion pump with means to trap noble gas ions on the cathode and secure them against reevolution. The means for trapping are in the form of a sublimation assembly which continually deposits getter material over the structure. Such pumps have been found quite satisfactory as electronic pumps for pumping both noble and nonnoble gases; however, even though the primary advantage of realizing a sputter-ion pump capable of pumping noble gas was realized, the pumping speed of the disclosed pump never approached the pumping speed of the typical getter-ion pump for nonnoble gases.

SUMMARY OF THE INVENTION

It is, therefore, a primary object of the present invention to provide an improved mass spectrometer leak detector.

It is a further object of the present invention to provide an improved ionic vacuum pump which utilizes the high pumping speeds of the getter-ion pumping techniques for the nonnoble gases, and a combined sputter-ion and getter-ion pumping technique for the noble gases.

It is still a further object of the present invention to provide an improved mass spectrometer leak detector which does not utilize an oil diffusion pump so that the high-vacuum system is substantially free of oil molecules.

It is still another object of the present invention to provide a new and novel electronic vacuum pump of the ion type which has pumping speeds comparable to those characteristic of sublimation pumps and which is capable of pumping noble gases. It is a still further object of the present invention to provide an improved electronic ion pump which has a high pumping speed, and which is capable of pumping noble gases.

It is still another object of the present invention to provide a mass spectrometer leak detector which is constructed to permit leak hunting of test specimens having leaks larger than those normally encountered, without any danger of damaging the spectrometer tube. More particularly, the leak detector includes means permitting the passage of the probe gases to the spectrometer tube while maintaining the required low pressure.

It is still another object of the present invention to provide a mass spectrometer leak detector which has a high pumping rate for both nonnoble and noble gases, which does not utilize an oil diffusion pump and thereby avoids contamination of the system with oil molecules, which permits the detection of leaks so large that they could not heretofore be safely measured, and which employs an ionic pumping system capable of quickly and effectively removing noble gases.

These and other objects of the present invention are achieved by providing a mass spectrometer which is coupled to a high-vacuum system having a mechanical roughing pump for reducing the pressure of the system to roughing pressure, and an improved ionic vacuum pump for further reducing the pressure of the system to the required spectrometer tube pressure. The improved high-vacuum pump is essentially a getter-ion pump which employs a sublimation technique whereby a gas-absorbing reactive metal is first sublimed and thereafter condensed on a relatively large surface such as the walls of the pump. The gas molecules or ions, as the case may be, which come in contact with the reactive metal deposit are first captured and then buried under the continually deposited getter material. In addition to the getter-ion pump portion, the improved ionic vacuum pump also includes what is quite similar to a cold cathode sputter-ion pump portion which has its cathodes disposed, in relation to the source of the reactive metal, such that their effective surfaces continually receive deposits of the reactive metal. This last feature is believed responsible for the property of the improved vacuum pump of this invention to pump noble gases.

There is further provided a bypass filter for the detection of large leaks. The bypass includes a membrane which is permeable only to the probe gas, but not to other gases, and which is utilized to isolate, pressurewise, the high-vacuum section associated with the spectrometer tube from the test vessel.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

BRIEF DESCRIPTION OF THE DRAWINGS

FIG. 1 is a schematic vacuum line diagram of a mass spectrometer leak detector constructed in accordance with the present invention;

FIG. 2 is a schematic vacuum line diagram of an alternate embodiment of the mass spectrometer leak detector of the present invention which is particularly suitable for the detections of large leaks;

FIG. 3 is a cross-sectional side view of one embodiment of a suitable ion-pump for use with the leak detector of FIG. 1;

FIG. 4 is a view taken along line 4-4 of FIG. 3; and

FIG. 5 is a view taken along line 5-5 of FIG. 3.

DESCRIPTION OF THE PREFERRED EMBODIMENT

Referring now to FIG. 1 of the drawing, there is shown a mass spectrometer leak detector 10 which is connected to a test vessel 12 exposed to a probe gas indicated at 14. Leak detector 10 comprises a high-vacuum system which may, from a functional point of view, be divided into a first portion 16, a second portion 18 and a third portion 20. Portion 16 is directly connected to test vessel 12 and usually includes an up-to-air valve 22 which allows this portion of the system to be vented to atmospheric pressure.

Vacuum system portion 16 is separated from portion 18 by a roughing valve 24 which can be turned to full-open or full-closed and from portion 20 by an isolation valve 26 which likewise is adjustable between a full-open and a full-closed full position.

Portion 18 of the vacuum system, which is utilized to evacuate the system to and is generally maintained at roughing pressure, is conventionally connected to a mechanical pump 28 through a foreline trap 30. There is also provided a roughing vacuum gauge 32 which is connected to indicate the pressure in portion 18. Portion 20 of the vacuum system is utilized to evacuate the system to and is generally maintained at spectrometer tube pressure and to determine the presence of the probe gas. Accordingly, portion 20 is connected to a mass spectrometer 34 and an ionic vacuum pump 36.

In operation, and after connecting the vessel under test to the vacuum system, up-to-air valve 22 is closed and roughing valve 24 is opened to reduce the pressure of the vacuum system to roughing pressure. Ordinarily, portion 18 is maintained at all times at roughing pressure which is increased only when roughing valve 24 is opened to evacuate vessel 12 and portion 16. As soon as the pressure in portion 16 drops back to roughing pressure, which is typically $10^{13}$ torr, roughing valve 24 is closed and isolation valve 26 is opened to reduce the pressure of the entire system except for portion 18 to the spectrometer tube pressure which is typically at or below $10^{16}$ torr.

Reduction of the pressure to spectrometer tube pressure is accomplished by a vacuum pump of the ionic type, such as the one described in my copending application, Ser. No. 427,833, now U.S. Pat. No. 3,391,303 or the ionic vacuum pump shown in FIGS. 3 to 5 herein and to be described hereinafter. Briefly, the ionic pump described in my copending application is a sputter-ion pump in which the cathodes have continually applied thereto a deposit of a getter material to make the pump effective in pumping noble gas not normally pumped by sputter-ion pumps. The continuous deposit of the reactive material on the cathodes covers the noble gas removed from the system as positive ions by burial into the surface layer of the cathodes to thereby prevent, or at least minimize to a substantial extent, the reevolution of the noble gas ions.

After leak detecting, isolation valve 26 is closed to maintain the high-vacuum in portion 20, and up-to-air valve 22 is opened to vent portion 16 and test vessel 12 to atmospheric pressure to allow its removal from leak detector 10.

Referring now to FIG. 2 of the drawing, in which like reference numerals are used to designate parts which are like those shown in FIG. 1, there is illustrated mass spectrometer leak detector 40 which is particularly useful in the detection of leaks which may be anywhere between very small and very large. Leak detector 40 has a vacuum system which includes portions 16, 18 and 20 and an additional portion 42 which is disposed between portions 16 and 20. More particularly, portion 42 is communicated with portion 16 through a throttling valve 44 which allows for the continuous adjusting of the flow from fully open to fully closed, and to portion 20 through an isolation valve 46. Further, portion 16 and portion 42 are communicated with one another through a pipe 48 which includes a membrane means 50 which is somewhat permeable to small atomic gases such as probe gas helium, and almost completely impermeable to larger atomic gases such as nitrogen, oxygen, water vapor and the other components of atmospheric air. A suitable material for membrane 50 is a thin film of Mylar material, an organic polymer available from Du Pont De Nemours E.I. & Co.

The operation of leak detector 40 will now be explained for the three situations encountered where the leak is very small, of intermediate size, and very large.

If the leak is very small, as determinable from indications provided by roughing gauge 32 when roughing valve 24 is opened, throttling valve 44, which is initially closed to protect the system, is turned to its fully open position so that portion 42 becomes a part of portion 16. Leak detection is accomplished as explained in connection with the operation of FIG. 1.

If the leak is of intermediate size, as again determinable from indications provided by roughing gauge 32 when roughing valve 24 is opened, originally closed throttling valve 44 is only partially opened so that the pressure in portion 42 is maintained intermediate the pressure in portions 16 and 20. This is akin to partially isolating, pressurewise, the vessel under test from the mass spectrometer. Since membrane 50 is permeable to the probe gas, there is no isolation of the probe gas since the same is communicated to the mass spectrometer through pipe 48. However, the membrane provides complete isolation for all gases other than the probe gas.

If the leak is very large, again as determinable from an inspection of roughing gauge 32 when roughing valve 24 is opened, throttling valve 44 is maintained in its closed position since the slightest opening will make it impossible to maintain the high vacuum in portion 20. However, because of bypass 48 and membrane 50, leak testing can be performed with throttling valve 44 fully closed, and the mass spectrometer maintained at a high vacuum. The procedure utilized is as follows. When roughing gauge 32 shows that the pressure in portion 16 cannot be reduced to a value such as, for example, $10^{13}$ torr, the vessel under test is removed from leak detector 40, and the test port is closed. The entire vacuum system is then roughed down to roughing pressure with throttling valve 44 being fully open until the pressure is sufficiently low to allow isolation valve 46 to be opened. Throttling valve 44 is then fully closed, and leak detector portion 20 will remain at a high vacuum up to throttling valve 44. The vessel being tested is again connected to leak detector portion 16, and roughing with roughing pump 28 is started in the ordinary manner. Leak detection is possible because the probe gas, and particularly helium, enters leak detector portion 20 through membrane 50 and bypass 48 for detection by a mass spectrometer 34.

An alternate embodiment of the arrangement shown in FIG. 2 is obtained by removing isolation valve 46 entirely from the system, and replacing throttling valve 44 with an isolation valve. The advantage of this modification, as will become clearer hereinafter, is that it has one less valve and therefore greater simplicity and, further, that if the vessel being tested has a very large leak, it will become unnecessary to remove the test vessel from leak detector portion 16. However, it also has the disadvantage that in case of replacement of the membrane it will become necessary to expose leak detector portion 20 to atmospheric pressure and, further, it is usually not possible to utilize this arrangement with leaks of intermediate size because the membrane has too high an impedance to probe gas flow unless it has a very large surface area. In operation of the device as modified, leak detector portions 20 and 42 will always be at ultra-high-vacuum pressure, and valve 44 will either be fully opened in case of small leaks, or fully closed in case of large leaks, but will never be half closed.

Referring now to FIGS. 3—5 of the drawing, there is shown an ionic vacuum pump 60 which comprises a substantially cylindrical metallic housing 61 having a smaller boxlike extension 62 on one end thereof and a coupling flange 63 defining the throat of the pump at the other end thereof. Housing 61 defines an interior space 64 having an inner wall 65 which may be maintained at ground potential as indicated at 66. Disposed within space 64 is an electron beam sublimator 67 including a pair of reactive metal targets 68A and 68B, and a source of bombarding electrons such as filament 69 which is surrounded by a shield 70.

Filament 69 is connected to a source of filament potential 71, as shown in FIG. 5, and shield 70 is generally maintained at or near filament potential, and is therefore also connected to source 71 to bias the same at a potential which generates and shapes an electric field for collimating the filament electrons into an efficient electron beam for bombarding targets 68A and 68B while blocking the line of sight between filament 69 and metal targets 68A and 68B. The purpose of the line-of-sight blocking between the filament and the target is to prevent, or at least materially reduce, the deposit of sublimated material upon the filament.

Targets 68A and 68B are connected to a source 72 of high voltage with respect to filament 69, and are constructed of a getter material such as titanium. When so connected, the electrons emitted from filament 69 are accelerated towards targets 68A and 68B by the electric field subsisting between the filament and the targets, as modified by shield 70. The stream of electrons bombarding the titanium targets sublime the getter material for subsequent deposit upon wall 65 of space 64.

From the foregoing description it is thus seen that space 64 defines what is generally referred to as a sublimation pump which pumps gases by absorbing gas molecules with a getter material. More particularly, the previously deposited getter material upon the wall of pumping chamber 64 absorbs many of the molecules constantly colliding with the walls, and the subsequent deposits of the constantly generated getter material covering the previously absorbed molecules. This pumping principle is referred to as getter-ion pumping, and is not limited to a deposit of getter material from a sublimed getter material. For the purpose of the present invention it is immaterial which of the various known methods are used to cause a continuous deposit of getter material vapor upon the pump chamber walls; the method may comprise the heating of the getter in an arc or otherwise, and may include boiling after liquefying or evaporating as in an arc.

It is well known that getter-ion pumping is capable of fast pumping speeds and is generally very efficient. However, the technique is not suitable for pumping noble gases since noble gases do not react with the getter material to the extent of assuring capture and subsequent burial. Instead, noble gas molecules are not absorbed to any significant extent, and getter-ion pumps are generally regarded as incapable of pumping noble gases.

Boxlike extension 62 in pump 60 is provided to pump noble gases, and defines an interior boxlike space or chamber 76 for housing a pair of cathodes 77A and 77B which are connected to a source of cathode potential 78 which is negative with respect to housing 61. Cathodes 77A and 77B are disposed within the interior of pump 60 in such a manner that its effective surface is continuously receiving a deposit of getter material much like the walls of space 64. There are also provided means (not shown) to set up a strong DC magnetic field H across the cathodes as indicated at 79. The combination of interior space 76 with negatively biased cathodes 77A and 77B and magnetic field H comprise a structure which bears a certain resemblance to a sputter-ion pump, but which is operated in a different manner. Accordingly, cathodes 77A and 77B are biased by cathode potential 78 at a negative potential with respect to housing 61 which is grounded as shown by connection 66 in FIG. 4. Furthermore, a magnetic field, indicated by arrow 79, is present across chamber 76. Chamber 76 is a typical Pennings chamber which will perform as a sputter-ion pump, the housing of chamber 76 forming the anode, and electrodes 77 forming the cathodes. A full explanation of the Pennings chamber can also be found in U.S. Pat. No. 3,391,303, column 3, lines 17—40.

To fully understand the function and operation of chamber 76, a comparison with the function and operation of a typical sputter-ion pump may be helpful. A sputter-ion pump is a pump which is expensive, has a long life, is capable of pumping only at slow rates and has a high memory for noble gases because of the high rate of reevolution of noble gas ions. Sputter-ion pumps operate upon the principle of utilizing the electric field between the anode and cathode to accelerate electrons, and the magnetic field to spiral the accelerating electrons to increase their path length, a configuration also known as a Pennings discharge chamber. These accelerating and spiraling electrons will bombard gas molecules and thereby generate ions. The generated positive ions will bombard the cathodes which are constructed of a getter material and dislodge some of the cathode material and "sputter" this material on the walls of chamber 76. The sputtered getter material absorbs gas molecules in much the same way as explained in connection with a getter-ion pump, but is much less effective because sputtering is a very slow process.

Even though sputter-ion pumping action may result from the operation of chamber 76, this pumping action may be ignored for all practical purposes because the pumping action is, or may be made, negligible with that of the large getter-ion pump portion, or may be entirely dispensed with by making cathodes 77A and 77B out of material which is not a "getter." By placing sputter cathodes 77A and 77B such that they are within line of sight of getter targets 68A and 68B, getter material vapor is continually and constantly deposited upon the sputter cathodes. This results in a mode of operation which is different from an ordinary sputter-ion pump in that it pumps noble gases while its capacity for pumping nonnoble gases is neglected or ignored.

The operation of chamber 76 as a noble gas pump will now be explained. The chamber with the cathodes and the electric and magnetic field is essentially a Pennings discharge chamber which drives positive ions, usually the noble gas ions, against the cathode with great force. As a result of being driven against the cathodes, they bury deep into the surface layer of the cathode and, except for sputtering action, may be safe against being disinterred. It is, therefore, seen that the sputtering action is not desired since it only serves to dislodge previously captured noble gas ions and thereby cause reevolution of the noble gas. By constantly depositing new getter material on the cathodes, the previously buried ions are covered, or buried deeper, and thereby reevolution is minimized. It is this action of the pump that makes it a noble gas pump, and its operation as a sputter pump is of little importance so that the material of the cathodes is selected for reasons other than providing a sputter.

For reasons which are not understood, it has been found that constructing the cathodes of the Penning discharge chamber of titanium increases the starting characteristics of the ionic pump of this invention. However, it has also been found that, once the pump is started and operating, the fact that the cathodes are constructed of a getter material is no longer of any measurable importance. Since the purpose of the Penning cathodes is to accommodate positive ions, the greater the number and/or size of the interstices the more effective is the noble-gas-pumping action of the resulting structure. For example, body-centered cubic materials, such as iron, are preferred cathode materials over closely packed metals such as titanium.

Regarding the relative pumping speeds of noble and nonnoble gases, the following considerations apply. The entire interior surface of chamber 64 and perhaps that of chamber 76 and the cathodes participate in the process of pumping nonnoble gas. More properly stated, all surfaces receiving a deposit of getter material from targets 68A and 68B are getter-ion-pumping surface, and define the effective nonnoble-gas-pumping area. Similarly, the portion of cathodes 77A and 77B which are disposed to receive the Penning discharge, generally the facing cathode surfaces, and getter vapor deposits define the effective noble-gas-pumping area. Accordingly, the noble-gas-pumping chamber pumps noble gases and nonnoble gases.

Generally speaking, the design of a pump in accordance with the present invention will take into account the particular gas to be pumped and particularly the ratio of noble to nonnoble gases therein. Since the noble gas percentage is usually small, less than 1 percent in air, the first criteria is to determine the necessary effective nonnoble-gas-pumping area to provide the desired pumping speed at the throat of the pump. Thereafter, and depending on the percentage of noble gas present, the effective noble-gas-pumping area is determined. For most applications and particularly those involving the pumping of air and leak-detecting systems, an acceptable noble-gas-pumping speed is within the range of 1 percent to 3 percent of the net actual pumping speed of the air at the throat of the pump. Such low noble-gas-pumping speed requires only small cathodes, or cathodes with small effective pumping areas which are much less expensive than those with large effective pumping areas. In fact, a ratio of the effective noble-gas-pumping area to the effective nonnoble-gas-pumping area of around 0.15 has been found eminently satisfactory for leak detector application. Expressed in terms of the percentage of the cathode area to the wall area, this would be approximately 18 percent.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What I claim is:

1. In a leak detector having a sealed high-vacuum system including a first portion, a second portion and a third portion, with valve means disposed between said first and second portions and between said first and third portions, and with means for connecting a test vessel, exposed to a probe gas, to said first portion, and having a roughing pump connected to said second portion to reduce the pressure of said high-vacuum system to roughing pressure and a mass spectrometer connected to said third portion for detecting the presence of probe gas within said high-vacuum system, and having high-vacuum pump means connected to said third portion to reduce the pressure of said high-vacuum system from roughing pressure to mass spectrometer pressure, said pump means comprising:
    a getter-ion-pumping means including a chamber having walls defining a space in communication with said third portion, a source of getter material, and means for continually depositing some of said getter material upon said walls for capturing gas molecules colliding with said walls; and
    noble-gas-pumping means disposed within said space and including a positive ion target positioned with respect to said source of getter material and said depositing means for receiving a deposit of said getter material, means for generating positive ions from at least the noble gas molecules, and means for accelerating said positive ions towards said ion target for capture by said ion target and for burial by the getter material continually being deposited upon said ion target.

2. A leak detector in accordance with claim 1 in which said high-vacuum pump means forms the sole pumping means for reducing the pressure of the vacuum system from a selected pressure to mass spectrometer pressure.

3. A leak detector in accordance with claim 1 in which said means for continually depositing some of said material upon said walls of said getter-ion-pumping means comprises a vapor deposition means and said source of getter material is distinct and separate from said positive ion target.

4. A leak detector in accordance with claim 3 in which the effective area for capturing gas molecules is at least five times greater than the effective area for capturing positive ions.

5. A leak detector comprising, in combination:
    a sealed high-vacuum system including a first portion, a second portion and a third portion;
    valve means between said first and second portions and between said first and third portions;
    means for connecting a test vessel, exposed to a probe gas, to said first portion;
    a bypass portion for communicating said first portion with said third portion, said bypass portion including a membrane member which is permeable to said probe gas and impermeable to all other gases within said vacuum system;
    a roughing pump connected to said second portion to reduce the pressure of said high-vacuum system to roughing pressure;
    a mass spectrometer connected to said third portion for detecting the presence of probe gas withing said high-vacuum system; and
    high-vacuum pump means connected to said third portion to reduce the pressure of said high-vacuum system from roughing pressure to mass spectrometer pressure, said pump means comprising:
        a getter-ion-pumping means including a chamber having walls defining a space in communication with said third portion, a source of getter material, and means for continually depositing some of said getter material upon said walls for capturing gas molecules colliding with said walls, and
        noble-gas-pumping means disposed within said space and including a positive ion target positioned with respect to said source of getter material and said depositing means for receiving a deposit of said getter material, means for generating positive ions from at least the noble gas molecules, and means for accelerating said positive ions towards said ion target for capture by said ion target and for burial by the getter material continually being deposited upon said ion target.

6. A leak detector comprising, in combination:
    a sealed high-vacuum system including a first portion, a second portion and a third portion;
    valve means between said first and second portions and between said first and third portions;
    means for connecting a test vessel, exposed to a probe gas, to said first portion;
    a fourth portion disposed between said first portion and said third portion; throttling valve means between said first portion and said fourth portion; isolation valve means between said fourth portion and said third portion; a bypass portion for communicating said first portion with said fourth portion, said bypass portion including a membrane member which is permeable to said probe gas and impermeable to all other gases withing said vacuum system;

a roughing pump connected to said second portion to reduce the pressure of said high-vacuum system to roughing pressure;

a mass spectrometer connected to said third portion for detecting the presence of probe gas within said high-vacuum system; and high-vacuum pump means connected to said third portion to reduce the pressure of said high-vacuum system from roughing pressure to mass spectrometer pressure, said pump means comprising:

a getter-ion-pumping means including a chamber having walls defining a space in communication with said third portion, a source of getter material, and means for continually depositing some of said getter material upon said walls for capturing gas molecules colliding with said walls; and noble-gas-pumping means disposed within said space and including a positive ion target positioned with respect to said source of getter material and said depositing means for receiving a deposit of said getter material, means for generating positive ions from at least the noble gas molecules, and means for accelerating said positive ions towards said ion target for capture by said ion target and for burial by the getter material continually being deposited upon said ion target.

7. A vacuum pump comprising:

an evacuable chamber having a wall defining a main and an auxiliary space adapted to contain gas molecules and including means for coupling said chamber to an evacuable system said main space being larger than said auxiliary space, a source of getter material disposed withing said main space;

means for vaporizing some of said getter material from said source and for depositing the vapor upon the wall defining said chamber to absorb gas molecules coming into contact with said walls;

cathode means immovably disposed within said auxiliary space and positioned to have deposited thereon a portion of said vaporized getter material;

means for connecting said cathode means to a source of negative potential with respect to the potential of said walls to provide an electric field; and means for providing a magnetic field in a selected direction across said auxiliary space and of such an extent that at least the major portion of said cathode means lies within said magnetic field whereby some of said gas molecules are ionized by collision with electric and magnetic field accelerated electrons for absorbing impact upon said cathode means and subsequent burial by the deposit of getter material thereon.

8. A vacuum pump in accordance with claim 7 in which said cathode means comprises a pair of facing cathode electrodes whose effective area comprises the major portion of the facing surfaces of said cathode electrodes, and in which said effective area is less than one-fifth of the area of said wall.

9. A vacuum pump in accordance with claim 8 in which said auxiliary space and said means for coupling are separated by said main space.

10. A vacuum pump in accordance with claim 7 in which said cathode means is constructed of a material optimizing noble-gas-ion retention after absorbing impact.